United States Patent [19]

Gustafsson

[11] Patent Number: 5,189,807
[45] Date of Patent: Mar. 2, 1993

[54] METHOD AND ARRANGEMENT FOR DETERMINING THE LINEAR (HEAT) EXPANSION OF ELONGATED BODIES

[75] Inventor: Carl-Erik Gustafsson, Eskilstuna, Sweden

[73] Assignee: C. E. Johansson AB, Eskilstuna, Sweden

[21] Appl. No.: 829,296

[22] Filed: Feb. 3, 1992

[30] Foreign Application Priority Data

Feb. 8, 1991 [SE] Sweden .............................. 9100393

[51] Int. Cl.$^5$ ............................................. G01B 11/04
[52] U.S. Cl. ..................................................... 33/702
[58] Field of Search ........................................ 33/702

[56] References Cited

U.S. PATENT DOCUMENTS 4,831,737  5/1989  Grund .................................. 33/702

FOREIGN PATENT DOCUMENTS 0294563  12/1988  European Pat. Off. .............. 33/702

Primary Examiner—Harry N. Haroian
Attorney, Agent, or Firm—Nies, Kurz, Bergert & Tamburro

[57] ABSTRACT

A method for determining and, when appropriate, compensating for the linear (heat) expansion of elongated bodies (1), such as physical length scales (1) or of elongated bodies which are intended to support physical length scales on, e.g., instruments or measuring machines equipped with physical length scales, in which measurement errors occur because of length deviations of the scale (1) as a result of deviations from a reference temperature at which the scale was calibrated.

The method is mainly characterized by measuring the linear expansion of the body (1) in relation to at least one reference (6) made of a material whose coefficient of linear (heat) expansion ($\alpha$) deviates from the coefficient of linear (heat) expansion of the body material, and thereafter determining, when appropriate, a compensation factor for correcting the body length.

The invention also relates to an arrangement for carrying out the method.

26 Claims, 2 Drawing Sheets

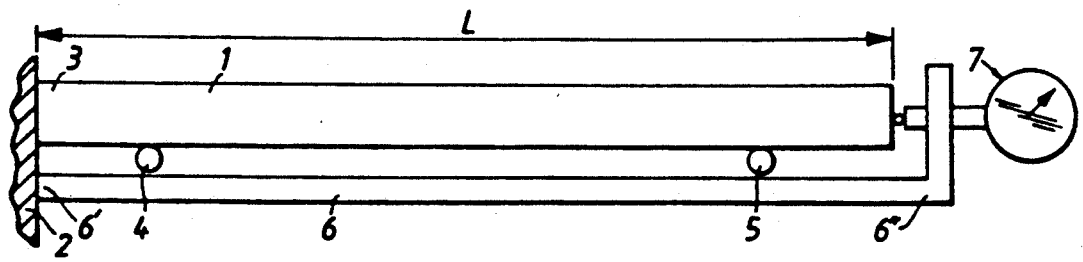
Fig. 1
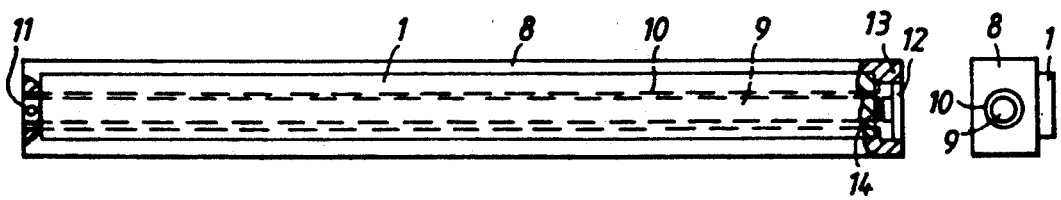
Fig. 2    Fig. 3
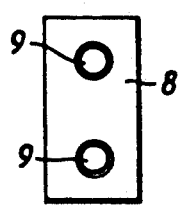    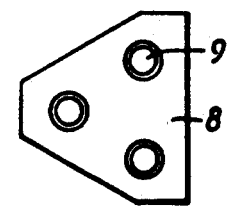
Fig. 4    Fig. 5
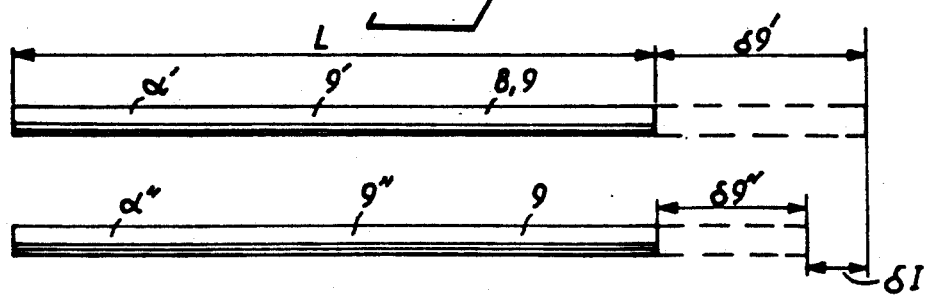
Fig. 6

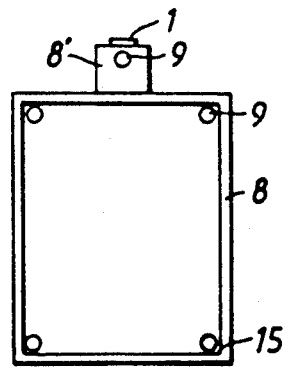
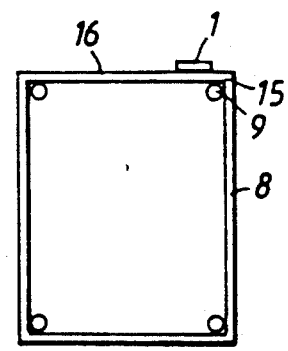
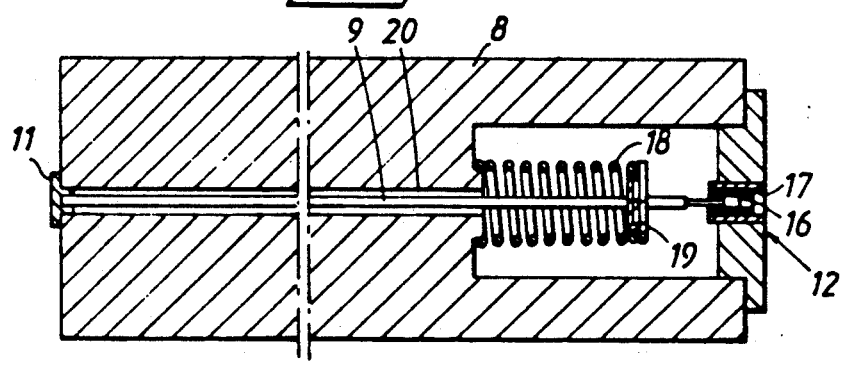
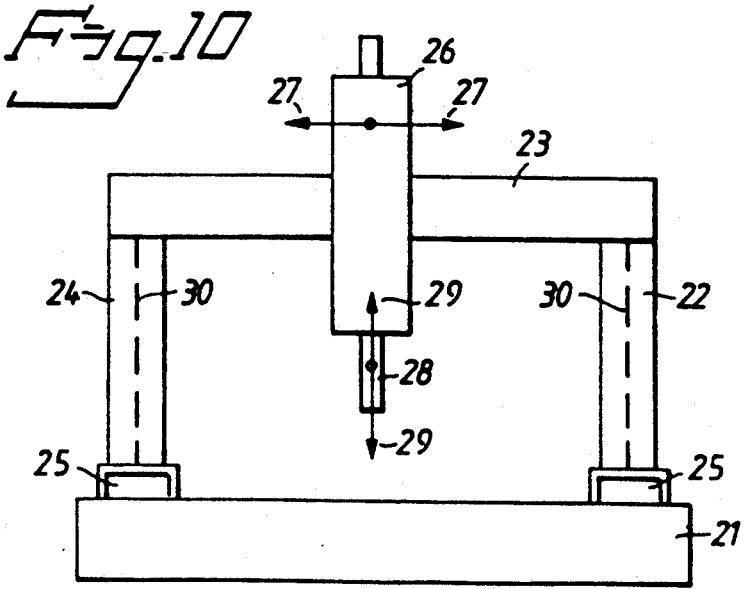

METHOD AND ARRANGEMENT FOR DETERMINING THE LINEAR (HEAT) EXPANSION OF ELONGATED BODIES

The present invention relates to a method for determining and, when appropriate, compensating for thermal linear expansion of elongated bodies, such as physical length scales or elongated bodies intended to carry physical length scales on, e.g., instruments or measuring machines equipped with physical length scales in which measuring errors may occur as a result of length deviations of the scale due to deviations from a reference temperature at which the scale was calibrated.

The invention also relates to an arrangement for carrying out the method.

BACKGROUND OF THE INVENTION

When measuring lengths with the aid of instruments or measuring machines that are equipped with physical length scales, temperature deviations from a reference temperature will constitute a source of error. The temperature that prevails during a measuring occasion will normally deviate from the reference temperature. The reference temperature can normally only be included in particularly well-equipped measuring laboratories. Three types of measurement errors occur when measuring in temperature conditions that are not ideal:

1) Errors which are caused by dimensional changes in the measured object due to linear (heat) expansion.
2) Errors due to changes in the geometry of the machine or corresponding arrangement due to thermal linear expansion.
3) Errors caused by changes in the measurement of the length reference, i.e. the graduated measuring scale, due to linear (heat) expansion.

The present invention relates to a method and to an arrangement for determining and correcting errors of this last mentioned kind.

In some instances, the inventive method and arrangement may also be used to determine and correct errors according to (2) above.

It has earlier been proposed to manufacture scales from material whose coefficient of linear expansion is equal to zero, or close to zero. This proposal, however, is encumbered with several drawbacks. For example, such material is very expensive and creates difficult construction problems when the material is to be incorporated in arrangement and machines of the kind intended here, which are often constructed from material whose coefficient of linear expansion deviates from zero and which has a coefficient of linear expansion which greatly deviates from zero.

It has also been proposed that because the change in length of these scales is often repeatable in these contexts, the temperature of the scale can be measured and the linear expansion then calculated on the basis of the coefficient of linear expansion of the scale material, in accordance with the formula:

$$\delta = \alpha \cdot dT \cdot L$$

where
- $\delta$ = the total linear expansion
- $\alpha$ = the coefficient of linear expansion of the scale
- $dT$ = the deviation from the reference temperature
- $L$ = scale length.

One serious drawback with this method, however, is that it is necessary to measure temperature extremely accurately and also to measure temperature at several places along the scale, since the temperature is liable to vary along said scale, and also that the coefficient of linear expansion must be known to extreme degrees of accuracy.

SUMMARY OF THE INVENTION

The present invention relates to a method and to an arrangement which are not encumbered with the drawbacks of the known technique and which will enable the linear (heat) expansion of elongated bodies, such as scales, to be determined very accurately, and also to enable compensation to be made for such expansion.

Thus, the invention relates to a method for determining, and when appropriate, compensating for the linear (heat) expansion of elongated bodies, such as physical length scales, or elongated bodies which carry physical length scales on, e.g., instruments or measuring machines equipped with physical length scales, where errors in measurement occur as a result of deviations in the length of the scale due to temperature deviation from the reference temperature at which the scale was calibrated.

The method is particularly characterized by measuring the linear expansion of the body in relation to at least one material reference having a coefficient of linear (heat) expansion which deviates from the coefficient of linear (heat) expansion of the material from which said body is made, and thereafter, in appropriate cases, determining a compensation factor with which the measured length of the body can be corrected.

The invention also relates to an arrangement for determining and, when appropriate, compensating for the linear (heat) expansion of elongated bodies, such as physical length scales or elongated bodies which carry physical length scales, for instance, in instruments and measuring machines, where measurement errors or the like are caused by deviations in length as a result of temperatures which deviate from a reference temperature at which the length of the body was calibrated.

The arrangement is particularly characterized by means for measuring the linear expansion of the body in relation to at least one material reference whose coefficient of linear (heat) expansion is known and which deviates from the coefficient of linear (heat) expansion of the body material, thereby enabling a compensation factor for correcting the measured length of the body to be determined.

BRIEF DESCRIPTION OF THE DRAWING

The invention will now be described in more detail with reference to exemplifying embodiments thereof and also with reference to the accompanying drawings, in which FIG. 1 illustrates a first embodiment of an inventive arrangement, seen transversely to the long axis of the physical length scale;

FIG. 2 illustrates schematically a second embodiment of an inventive arrangement as seen transversely to the long axis of the scale;

FIG. 3 shows the arrangement of FIG. 2 as seen from the right in FIG. 2;

FIGS. 4 and 5 illustrate schematically two different embodiments of inventive arrangements, in which several reference elements are used;

FIG. 6 illustrates schematically the use of a reference element which has a coefficient of linear expansion distinct from zero;

FIG. 7 illustrates schematically a beam which supports a scale, a scale reference, and references for different parts of the beam, said beam being seen in the direction of its longitudinal axis;

FIG. 8 illustrates schematically an embodiment which is essentially similar to the embodiment of FIG. 7 but which lacks a separate scale reference;

FIG. 9 is a schematic, axial section view of one embodiment of a reference element which has the form of a relatively thin filament or wire placed under tension; and FIG. 10 illustrates schematically a portal type three-axis coordinate measuring machine constructed in accordance with the invention and seen generally perpendicular to the plane of the main extension of the portal.

DESCRIPTION OF THE PREFERRED EMBODIMENTS

The embodiment illustrated in FIG. 1 includes an elongated body in the form of a physical length scale which is firmly fixed to a scale-supporting part 2 at its one end 3, and which is preferably placed on supports 4, 5 such as to enable linear changes to take place freely where linear (heat) expansion of the body is to be determined and where compensation is intended to be made for such linear expansion, in appropriate instances.

The reference 6 identifies a rod-like reference element which is made from a material whose coefficient of linear (heat) expansion is known and which is firmly mounted on said supporting part 2 at its one end 6' and which extends parallel with the scale 1. The embodiment also includes a length indicator 7 which is located at the free end 6" of the reference 6 and which functions to measure the linear expansion of the scale in relation to the reference.

According to one embodiment, the reference 6 is made from a material whose coefficient of linear expansion, $\alpha$, is essentially equal to zero. With this illustrated arrangement, the indicator shows the linear expansion of the scale directly, since the length of the reference is constant. The reference 6 is made, for instance, from a ceramic material retailed commercially under the trade name Zerodur.

In the case of the embodiment illustrated in FIG. 2, the scale 1 is fixed, for instance glued, to a supporting bar 8, forming a scale-supporting body, said bar 8 preferably having the same $\alpha$-value as the scale. In accordance with one preferred embodiment of measuring machines, the supporting bar 8 is comprised of a machine shaft or axle. The reference numeral 9 identifies a rod-like reference element which extends in a bore 10 passing along the whole length of the bar, and is firmly mounted in the bar at one end 11. The reference numeral 12 identifies a sensor, preferably an electronic sensor, which is intended to determine the position of the free end 13 of the supporting bar 8 in relation to the position of the free end 14 of the reference rod 9.

FIGS. 4 and 5 illustrate respective different modifications of the arrangement illustrated in FIG. 2, in which reference rods 9 are disposed at different locations as seen in the cross-section of the supporting bar (the supporting body), thereby enabling local linear expansions to be determined and, when appropriate, to be corrected, for instance expansions which tend to bend the bar/body.

It is assumed in the aforedescribed and illustrated embodiments that the reference 9 is made from a material whose coefficient of linear (heat) expansion $\alpha$ is essentially equal to zero, although it will be shown below that the reference 9 can also be made from material whose $\alpha$-value differs from zero. In this case, however, in order to obtain an absolutely precise measurement of the linear expansion of the control bar 8, it is also necessary to know the coefficient of linear (heat) expansion $\alpha$ of the bar 8 material.

In distinction to the accurate temperature-measuring process based on the method described on page 2, lines 13 to 30, very small demands are made in this case on the accuracy of the $\alpha$-value of the bar material. The precision afforded by standard textbooks is quite sufficient, while when applying the temperature-measuring method, the value of $\alpha$ must be known to a precision greater than $2.10^{-8}$ in the last decimal.

FIG. 6 illustrates schematically an embodiment in which a reference bar 9' has a coefficient of linear (heat) expansion $\alpha'$ which may differ from zero, and a bar 9" which has the known coefficient of linear (heat) expansion $\alpha''$. For the sake of simplicity, it is assumed in the following description that the length L of the two bars are equal, although this is not a requirement. Indicators, sensors or the like are used to measure $\delta I$, which constitutes the difference in linear expansion between the two bars.

The linear expansion of the reference bar 9' and the bar 9" can be calculated in accordance with the following.

If the reference and the bar are subjected to the same change in temperature dT, the following changes in length will occur:

$$\text{Reference } 9': \delta 9' = dT \cdot \alpha' \cdot L \tag{1}$$

$$\text{Bar } 9'': \delta 9'' = dT \cdot \alpha'' \cdot L \tag{2}$$

The relative change in length detected by the indicator/sensor is:

$$\delta I = \delta 9' - \delta 9'' \tag{3}$$

From the relationship (1)–(3), it is possible to calculate $\delta 9'$ to $$\delta 9' = \delta I / (1 - \alpha''/\alpha') \tag{4}$$

Since $\alpha'$ and $\alpha''$ are constants, the relationship (4) can be written as $$\delta 9' = K' \cdot \delta I \tag{5}$$

Correspondingly, $\delta 9''$ can be calculated as $$\delta 9'' = K'' \cdot \delta I \tag{6}$$

It will be evident from the relationships (5) and (6) that the temperature need not be known or measured. The indicator/sensor reading is graduated with a factor which is dependent on the $\alpha$-value of respective materials, namely on the $\alpha'$-value and the $\alpha''$-value. No high demands are placed on the accuracy with which the $\alpha'$-value and $\alpha''$-value are determined, since it is the quotient formed by the $\alpha'$-value and $\alpha''$-value that is effective.

When the length L of the reference and the bar differ, the lengths L' and L" will also be included in the graduating factor. No great accuracy is demanded of these terms.

In the embodiments illustrated in FIGS. 7 and 8, the bar 8 is a box-beam of generally square cross-section, preferably rectangular cross-section, in which a reference is mounted preferably internally and preferably at each corner 15 of the beam, for the purpose of measuring linear expansion of the beam, thereby enabling deformations corresponding to curvature of the beam locally to be determined. FIG. 7 illustrates an embodiment in which a separate reference 9 is provided for the scale 1, said scale being arranged adjacent a contact body 8' provided on the beam, wherein an arrangement essentially according to FIG. 2 is provided on the beam.

FIG. 8 illustrates a simpler arrangement, in which the scale 1 is placed, glued, on one side 16 of the beam adjacent a reference 9, which functions to measure local linear expansion of the beam, such as a reference located in a corner 15, as illustrated in FIG. 8. Embodiments which lack a glued scale can also conceivably be used solely for the purpose of detecting variations in the straightness of a reference straight-edge, for instance.

FIG. 9 illustrates a preferred embodiment of the arrangement. In FIG. 9, the reference numeral 8 identifies the elongated body whose linear expansion is to be monitored, the reference numeral 9 identifies the reference element, and the reference numeral 12 identifies an electronic sensor comprised of an iron core 16 and coils 17, the sensor in this case being a differential transformer type sensor. The reference element 9 is firmly mounted at one end on the elongated body 8 by means of a device 11. The arrangement also includes a spring 18 whose one end acts on the elongated body 8 and the other end of which acts on a seating 19 firmly connected to the reference 9. The characteristic feature of this arrangement is that the reference 9 is placed under strain. This prevents the reference 9 from bending laterally as a result of the buckling phenomenon which can occur when the reference is subjected to a compression force, particularly when the cross-section of the reference 9 is small in relation to its length. This enables the reference 9 to have the form of a thin wire or filament made of Invar material, or some other appropriate material.

It will be understood that various modifications can be made to this embodiment.

For example, the electronic sensor and the spring 18 can be combined to form a "pulling" sensor unit which is connected to the free end of the reference 9.

The channel 20 through which the reference 9 extends may conveniently be filled with some kind of suitable grease, for instance silicone grease, so as to improve the heat transfer between the elongated body 8 and the reference 9 and to dampen any resonant oscillations that may occur in the reference 9.

FIG. 10 illustrates an example of use in which the inventive arrangements are used to monitor the geometry of a machine.

FIG. 10 illustrates schematically a three-axis coordinate machine of the so-called portal kind. The reference numeral 21 identifies the measuring table/base plate of the machine. A portal, which is comprised of legs 22, 24 and a beam 23 extending in the X-coordinate, can be moved in the Y-direction on air bearings 25, i.e. in a direction perpendicular to the plane of the paper. A "Z-unit" 26 is journalled on the X-beam 23. The Z-unit can be moved along the X-beam, i.e. in the direction of the arrows 27. A measuring spindle 28 is journalled in the Z-box 26 and can be moved in the direction of one of the arrows 29.

The measuring scales in the X-axis 23, the Y-axis 25 and the Z-axis 28 of the machine shown in FIG. 10 may be provided with the aforedescribed arrangements for determining and compensating the length errors in the measuring scales caused by thermal expansion. Curvature of the beams 23, 25 and/or 28 can be determined and compensated for by means of the arrangements described in FIG. 7 and FIG. 8.

None of the legs 22 and 24 carry a measuring scale, but nevertheless affect the measuring result in the Z-direction, since they form a reference in the Z-direction together with the bearings 25 and the measuring table 21.

If the two legs have mutually the same difference with regard to the reference temperature, a resultant parallel displacement of the X-beam in the Z-direction occurs. If the differences are unequal, the result is a displacement in the Z-direction and also a change in the parallelity between the X-beam and the bottom plate 21. The geometry of the machine is affected in both instances.

When each of the legs is provided with an inventive arrangement 30, the variations in lengths of the legs can be determined and compensated for.

Another advantage afforded by the invention is that curvatures and length changes caused by factors other than heat, for instance variations in load, are detected and can be compensated for.

The inventive method and the manner of operation of the inventive arrangement will be understood in all essentials from the aforegoing. The linear expansion of an elongated body, such as a physical length scale or a body to which such a scale is affixed, is measured in relation to a reference which has a known coefficient of linear (heat) expansion, which may be equal to zero or approximately equal to zero. The reference element and the elongated body may be compared directly with regard to linear expansion, although the reference element can also be compared with another body which has the same coefficient of linear (heat) expansion as the first body, said reference element and said second body need not necessarily have the same length as the first body.

In the case of the FIG. 10 embodiment, both the spindle 28 and the legs 22, 24 are provided with inventive reference-measuring devices. In this case, the measurement values obtained with the spindle 28 may be corrected with three correction factors, namely:

1. From the reference system in the spindle 28.
2. From the reference system in the one leg 22.
3. From the reference system in the other leg 24.

In this case, 2 and 3 are weighted with factors which are dependent on the position of the Z-units along the X-axis.

It will be evident from the aforegoing that the invention affords important advantages. For example, the linear (heat) expansion which is to be determined in order to enable the correction of measuring values determined at a temperature which deviates from the temperature at which the length of an elongated body was calibrated is determined without needing to determine temperature and the coefficient of linear (heat) expansion to any great degree of accuracy. Furthermore, according to one embodiment, such determination is effected without the use of references in which the $\alpha$-value is substantially equal to zero.

Although the invention has been described and illustrated with reference to exemplifying embodiments thereof, it will be understood that other embodiments and minor modifications are conceivable without departing from the inventive concept.

I claim:

1. An arrangement for determining and enabling for compensating for linear, heat, expansion of at least one elongated body means, at least a portion of which constitutes a physical length scale means wherein measurement errors occur because of length deviations caused by deviations from a reference temperature at which the length of said body means was calibrated, and wherein at least one elongate reference element is provided, and devices (7, 12) are included for measuring the linear expansion of the elongated body means (1, 8, 22, 24, 28) relative to said at least one reference element (6, 9), said reference element being made from a material having a known thermal coefficient of linear, heat, expansion ($\alpha$) which deviates from the coefficient of linear, heat, expansion of the elongated body means material, thereby enabling a compensation factor, for correcting the length of the elongated body means, to be determined.

2. An arrangement according to claim 1, wherein said body means (1, 8, 28) has the form of a physical length scale (1) thereby enabling a compensation factor to be determined for correcting the measured values determined by said scale to be corrected.

3. An arrangement according to claim 1, wherein said reference element (6) is made from a material whose coefficient of linear, heat, expansion is essentially zero.

4. An arrangement according to claim 1, wherein said at least one body means (8, 28) and said at least one reference element (9, 9") are made from materials which have different coefficients of linear, heat, expansion ($\alpha'$, $\alpha''$) both of which deviate from zero; and wherein means are provided for measuring the difference in linear, heat, expansion ($\delta l$) between the body means and the reference element, thereby enabling the linear expansion of the said body means and of the said reference element to be calculated proportionally to the measured linear expansion difference ($\delta 9'$, $\delta 9''$).

5. An arrangement according to claim 1, wherein reference elements are disposed along an elongated body means at different locations thereon; and in that said body means carries at least one scale means, wherein the local linear, heat, expansion of said body means relative to respective ones of said reference elements enables measurements for determining geometric changes in the body means.

6. An arrangement according to claim 5, wherein said body means is at least a beam component and a scale means; and wherein said reference elements are mounted on and disposed to extend internally of the beam means.

7. An arrangement according to claim 5, wherein a reference element (9) is provided for said scale means (1) and is carried by said body means adjacent the scale means.

8. An arrangement according to claim 5, wherein a reference element is provided which is common to both the said scale means and to a part of said beam means located adjacent said scale means.

9. An arrangement according to claim 5, wherein said beam comprises a box beam of rectangular cross-section; and in that said reference elements are disposed internally of said box beam at locations adjacent the corners (15) of said box beam.

10. An arrangement according to claim 1, wherein said body means (8) is one leg (22, 24) of a portal machine having a plurality of legs and a cross-beam (23) carried by means of said legs (22, 24), and said scale means is mounted on said cross-beam.

11. An arrangement according to claim 1, wherein said at least one reference element is rod-shaped.

12. An arrangement according to claim 1, wherein said at least one elongated reference element has two ends and is firmly mounted at one of its ends (6', 11) and is the same length (6) as the said body means whose linear expansion is to be determined.

13. An arrangement according to claim 1, wherein said at least one reference element (9) includes means, mounting it to said body means, which will subject said reference element to a pulling force.

14. An arrangement according to claim 13, wherein said at least one reference element is a relatively thin wire.

15. An arrangement as defined in claim 1 wherein the arrangement includes a measuring machine and said elongated body means is part of the measuring machine and provides a said physical length scale means on said measuring machine.

16. A method for determining and, in appropriate cases, enabling compensating for the linear, heat, expansion of elongated body means, a portion of which constitutes a physical length scale means in which measurement errors occur because of length deviations of the scale means as a result of deviations from a reference temperature at which the scale means was calibrated, said method comprising measuring the linear expansion of the elongated body means (1, 8, 22, 24, 28) relative to at least one reference element (6, 9) made of a material whose coefficient of linear, heat, expansion ($\alpha$) deviates from the coefficient of linear, heat, expansion of the material from which the body means is made, and thereafter determining a compensation factor for correcting the measured expansion length of the body means.

17. A method according to claim 16, wherein said elongated body means (1, 8, 28) comprises an elongated body (8, 28) supporting said physical length scale means (1).

18. A method according to claim 16, wherein said reference element is (6, 9) made from a material whose coefficient of linear, heat, expansion is essentially equal to zero.

19. A method according to claim 16, wherein said elongated body means (8, 28) is made from a material whose coefficient of linear, heat, expansion ($\alpha$) deviates from zero, and said reference element is (9, 9") made from a material whose coefficient of linear, heat, expansion ($\alpha$) deviates from the coefficient of linear, heat, expansion of the elongated body means material, comprising the steps of measuring the difference ($\delta l$) of linear expansion between the body means and the reference element, and the further step of calculating the linear expansion ($\delta 9, \delta 9''$) of the body means and the reference element proportionally to the measured linear expansion difference.

20. A method according to claim 16, wherein reference elements are arranged along an elongated body means (8) at different locations, said body means supporting at least one scale means, the steps of measuring local linear expansion relative to respective reference elements and thereby determining the geometric changes in the elongate body means.

21. A method according to claim 20, wherein the elongated body means (8) comprises a beam element, and including the steps of mounting reference elements in said beam, extending in the longitudinal direction and internally thereof.

22. A method according to claim 16, wherein the elongated body means is a leg (22, 24) of a portal machine, in which a cross-beam (23) is supported by at least two legs (22, 24), and in which a unit (26) journalled on the cross-beam is provided with a measuring spindle provided with a scale means and mounted for displacement in a direction transversely to the longitudinal direction of the cross-beam, and including the steps of measuring at least the linear expansion of one of the measuring spindle and its scale means relative to at least one reference element.

23. A method according to claim 16, wherein at least one reference element (6, 9) is in the form of a rod-like body firmly held at one end (6) thereof and which has the same length as the elongated body means whose linear, heat, expansion is to be determined.

24. A method according to claim 16, including the step of subjecting the reference element (9) to a tension force.

25. A method according to claim 24, wherein the reference element comprises a relatively thin wire.

26. A method as defined in claim 17, wherein said elongated body means is part of a measuring machine which is equipped with said physical length scale means.

* * * * *